US010230628B2

(12) United States Patent
Ramaswamy et al.

(10) Patent No.: US 10,230,628 B2
(45) Date of Patent: Mar. 12, 2019

(54) CONTRACT-DEFINED EXECUTION OF COPY SERVICE

(71) Applicant: Cisco Technology, Inc., San Jose, CA (US)

(72) Inventors: Pavithra Ramaswamy, Fremont, CA (US); Umamaheswararao Karyampudi, San Jose, CA (US); Murukanandam Panchalingam, San Jose, CA (US); Harish Manoharan, San Jose, CA (US); Santosh Golecha, San Jose, CA (US); Pirabhu Raman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 15/217,945

(22) Filed: Jul. 22, 2016

(65) Prior Publication Data

US 2017/0302569 A1 Oct. 19, 2017

Related U.S. Application Data

(60) Provisional application No. 62/324,212, filed on Apr. 18, 2016.

(51) Int. Cl.
*H04L 12/721* (2013.01)
*H04L 12/46* (2006.01)
*H04L 29/08* (2006.01)

(52) U.S. Cl.
CPC .............. *H04L 45/32* (2013.01); *H04L 45/38* (2013.01); *H04L 67/1004* (2013.01)

(58) Field of Classification Search
CPC ...... H04L 45/32; H04L 45/38; H04L 12/4641
See application file for complete search history.

(56) References Cited

U.S. PATENT DOCUMENTS

2009/0116507 A1* 5/2009 Kanda .................... H04L 47/10
370/464
2015/0281099 A1* 10/2015 Banavalikar ........ H04L 12/4633
370/230

* cited by examiner

*Primary Examiner* — Gbemileke J Onamuti
(74) *Attorney, Agent, or Firm* — Polsinelli PC

(57) ABSTRACT

Systems, methods, and computer-readable storage media for executing a copy service. A copy service engine can monitoring network data flow in a network, detect packet data containing a contract defining copy parameters for the execution of a copy service, and determine, based on the contract, when the particular data flow hits a particular network node specified in the contract parameters. When the data flow hits the specified node, the copy service engine can execute the copy service which copies the particular data flow, determines one or more endpoints for sending the copied data flow, and deploys the copies to the one or more endpoints.

20 Claims, 14 Drawing Sheets

CONTRACT-DEFINED EXECUTION OF COPY SERVICE

CROSS REFERENCE TO RELATED APPLICATIONS

This application claims the benefit of U.S. Provisional Application No. 62/324,212, filed on Apr. 18, 2016, which is incorporated herein by reference.

TECHNICAL FIELD

The present disclosure relates generally to communication networks, and more particularly, to monitoring traffic in data center networks.

BACKGROUND

An ever increasing demand for cloud-based and virtualized services is rapidly changing existing network services and storage environments. For example, existing standalone storage environments are rapidly being replaced with large storage environments such as data centers, which are physically and/or logically separated from one another. Such large storage environments present new challenges to service providers such as performance requirements, latency, reliability, scalability, and the like. When cloud-based service providers fail to adequately address such challenges, underlying cloud-based services for customers may suffer (e.g., outages, downtime, reduced performance, etc.).

In an effort to overcome these challenges, cloud-based service providers increasingly employ various network monitoring technologies to meet or exceed customer expectations for services (e.g., performance, latency, reliability, scalability, etc.). However, such network monitoring technologies often prove problematic when scaling to accommodate the scope, size, and complexity of data center networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
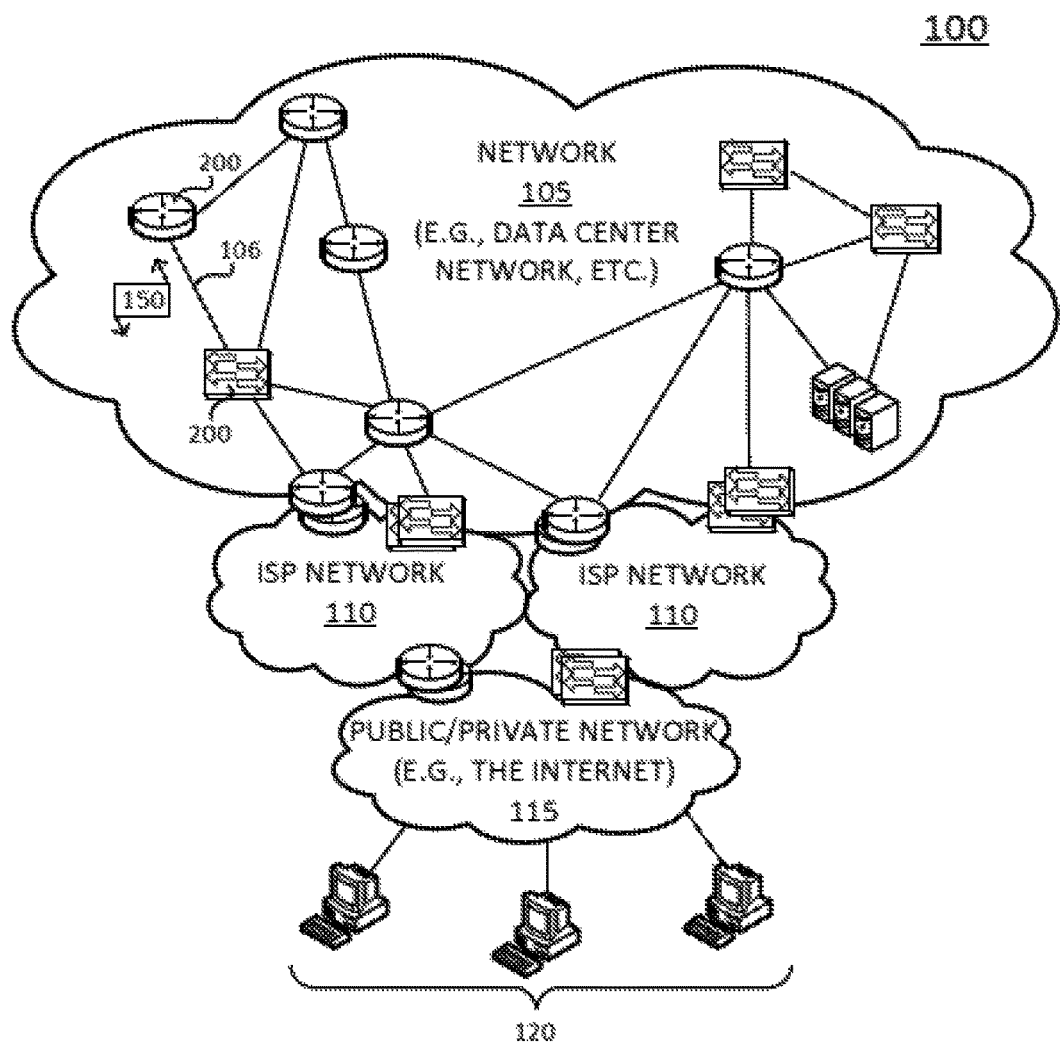
FIG. 1 illustrates a schematic diagram of an example communication network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for executing a copy service. In some cases, the copy service is executed on one or more of a cloud controller, a copy service engine associated with a cloud controller, a copy service engine associated with a network end point, etc. The copy service engine can monitor network data flow in a network, detect packet data containing a contract defining copy parameters for the execution of a copy service, and determine, based on the contract, when the particular data flow hits a particular network node specified in the contract parameters. When the data flow hits the specified node, the copy service engine can execute the copy service which copies the particular data flow, determines one or more analyzer endpoints for sending the copied data flow, and deploys the copies to the one or more analyzer endpoints.

In some cases, the copy parameters are defined in one or more of a Layer-2 field and a Layer-3 field of the contract parameters. The copy parameters can also specify that the copy service is executed at ingress to the particular network node specified in the contract parameters, at egress away from the particular network node specified in the contract parameters, and/or upon the data flow making a hop between the particular network node specified in the contract parameters and another network node.

In some cases, the copy service determines that one or more endpoints are locally connected to the particular network node specified in the contract parameters, deploys copies to the locally-connected one or more analyzer endpoints without an additional header. In some cases, the copy service deploys the copies by flooding each of the one or more analyzer endpoints with the copied data flow. When one or more analyzer endpoint are connected in a VLAN, the copy service can be configured to cause the VLAN to resolve how the copies are distributed to the analyzer endpoints in the VLAN.

In some cases, when a contract with copy action hits a network node, the copies to local analyzer end points are sent from the network node itself. A single copy then is sent to remote network nodes where there are more analyzer end points are located. The packet uses a special VLAN through the fabric identifying the analyzer group. Once the packet reaches the remote network node, the copies are flooded to all the member ports of the VLAN.

Description

A communication network is a geographically distributed collection of nodes interconnected by communication links and segments for transporting data between end nodes, such as personal computers and workstations, or other devices, such as sensors, etc. Many types of networks are available, with the types ranging from local area networks (LANs) and wide area networks (WANs) to overlay and software-defined networks, such as virtual extensible local area networks (VXLANs).

LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. Notably, LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Communication networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

FIG. 1 illustrates a schematic diagram of an example communication network 100 illustratively including a data center network 105, one or more Internet Service Provider (ISP) network(s) 110, and a public/private network 115 (e.g., the Internet). Operatively, data center network 105 hosts computing resources (e.g., applications, services, storage, network infrastructure, and the like) and provides access to such computing resources to one or more client device(s) 120 over public/private network 115 and corresponding ISP network(s) 110. Further, as shown, data center network 105 includes nodes/devices 200 (e.g., routers, sensors, servers, computers, etc.) interconnected by one or more communication links 106. These nodes/devices operate to route requests and facilitate access to computing resources from data center network 105. For example, the nodes/devices 200 may direct data packets or messages from a source node to a destination node over the one or more communication links 106.

Communication links 106 may be wired links or shared media (e.g., wireless links, PLC links, etc.) where certain nodes/devices 200 may be in communication with other nodes/devices based on, for example, distance, signal strength, network/node topology, current operational status, location, etc. Further, certain nodes/devices 200 may be located near an "edge" of a network. In certain instances, these nodes/devices may be referred to as "edge devices", which operatively serve as a gateway for respective networks and represent a first decision point for routing message traffic entering the respective network. For example, some edge devices may designate or flag individual traffic packets for particular treatment, as is appreciated by those skilled in the art.

Data packets 150 (e.g., traffic and/or messages) may be exchanged among the nodes/devices 200 in communication network 100 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Those skilled in the art will understand that any number of nodes, devices, communication links, and the like may be used, and that the view shown herein is for simplicity. Also, those skilled in the art will further understand that while communication network 100 (including networks 105, 110, and 115) is shown in a certain orientation, such orientation is merely an example for purposes of illustration, not limitation.

Figure 2:
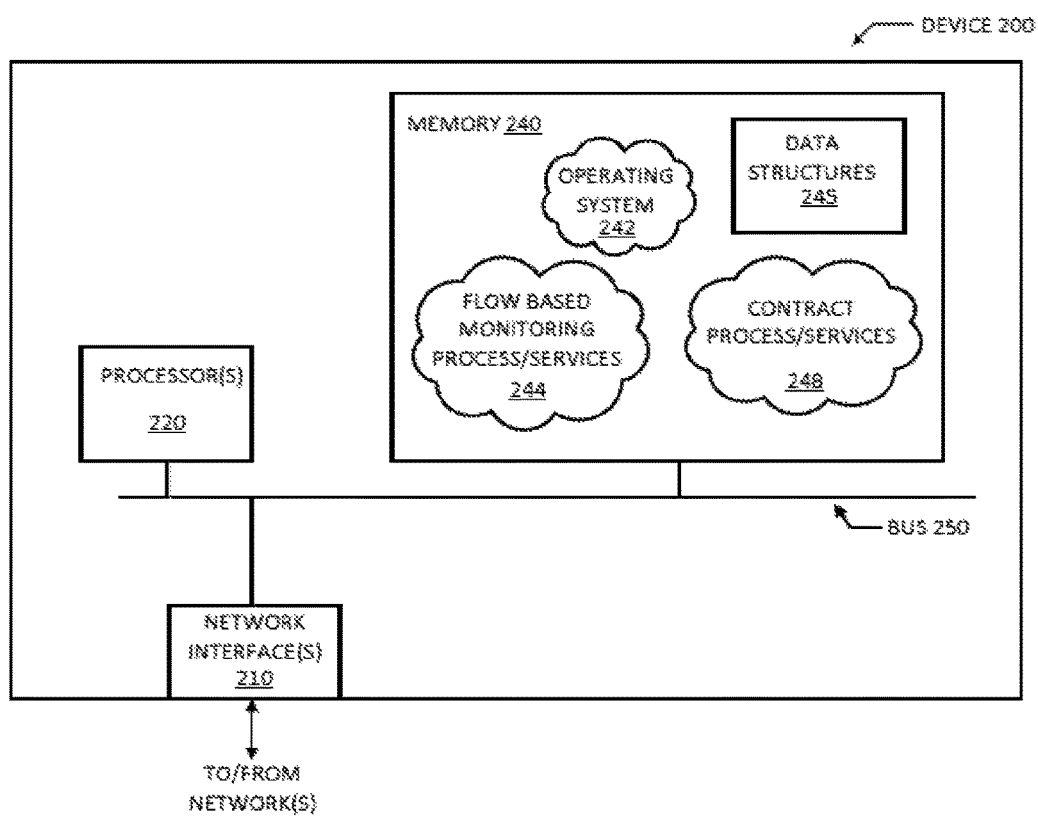
FIG. 2 is a schematic block diagram of an example node/device.

FIG. 2 is a schematic block diagram of an example node/device 200 that may be used with one or more embodiments described herein, e.g., as one or more of the nodes/devices shown in FIG. 1. Device 200 particularly includes one or more network interfaces 210, one or more processors 220, and a memory 240 interconnected by a system bus 250.

Network interface(s) 210 contain the mechanical, electrical, and signaling circuitry for communicating data over links 106 coupled to one or more nodes/devices shown in communication network 100. Network interfaces 210 may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

Memory 240 includes a plurality of storage locations that are addressable by processor(s) 220 and network interfaces 210 for storing software programs and data structures associated with the embodiments described herein. Processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise a flow based monitoring process/service 244, and a contract process/service 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Illustratively, the techniques described herein may be performed by hardware, software, and/or firmware, such as in accordance with flow based monitoring process 244 and/or contract process 244, which may contain computer executable instructions executed by the processor 220 (or independent processor of network interfaces 210) to perform functions described herein. Further, the techniques herein may be treated as extensions to certain conventional services, such as those related to port mirroring and/or port monitoring (e.g., Switched Port Analyzer (SPAN) services, remote SPAN (RSPAN) services, Encapsulated RSPAN (ERSPAN) services, and the like), as is appreciated by those skilled in the art.

As discussed above, cloud-based service providers increasingly employ monitoring technologies to ensure network access, efficiency, reliability and the like. However, such network monitoring technologies often prove problematic when scaling to accommodate the scope, size, and complexity of data center network. As mentioned, a data center typically includes a complex network of physical and/or virtual systems, portions of which are shown in FIG. 3.

Figure 3:
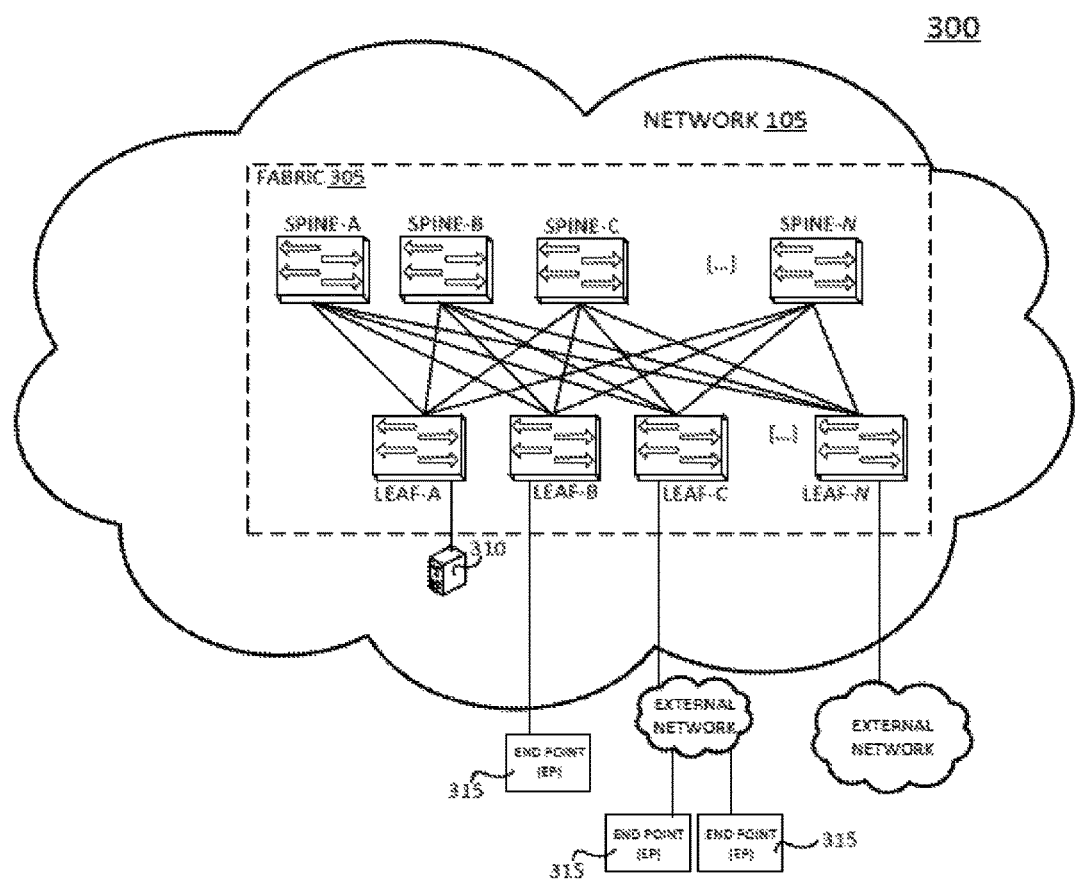
FIG. 3 particularly illustrates an exemplary architecture for data center network.

FIG. 3 particularly illustrates an exemplary architecture 300 for data center network 105. Architecture 300 includes a fabric 305 formed from a physical underlay networked devices. Here, network fabric 305 includes spine switches A-N (spine-A-spine N), and leaf switches A-N.

Spine switches A-N can include L3 switches and/or the spine switches may also perform L2 functionalities (e.g., supporting certain Ethernet speeds, Ethernet Interfaces, etc.). Generally, spine switches A-N are configured to lookup a locator for a received packet in its forwarding table and forward the packet accordingly. However, in some embodiments, one or more of spine switches A-N may be configured to host a proxy function that matches the endpoint address identifier to a locator mapping in a mapping database on behalf of leaf switches that do not have such mapping. For example, spine switch A can employ the proxy function to parse an encapsulated packet to identify a destination locator address of a corresponding tenant. Further, spine switch A can perform a local mapping lookup in a database to determine a correct locator address of the packet and forward the packet to the locator address without changing certain fields in the header of the packet. As shown, spine switches A-N connect to leaf switches A-N in fabric 305.

Leaf switches A-N can include access ports (or non-fabric ports) and fabric ports (not shown). Fabric ports typically provide uplinks to the spine switches, while access ports can provide connectivity for devices such as device 310 (e.g., a host, a virtual machine (VM), a hypervisor, etc.), and for one or more "external networks" (labeled as shown). Leaf switches A-N may reside at an edge of fabric 305, and can thus represent a physical network edge. In some cases, leaf switches A-N can be top-of-rack (ToR) switches configured according to a ToR architecture. In other cases, leaf switches A-N can be virtual switches embedded in servers, or even aggregation switches in any particular topology, such as end-of-row (EoR) or middle-of-row (MoR) topologies. Leaf switches A-N can also represent aggregation switches, for example.

Leaf switches A-N are generally responsible for routing and/or bridging tenant packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, one or more leaf switches A-N can contain virtual switching functionalities, including tunneling functionality (e.g., VPN tunneling, etc.) to support network connectivity through fabric 305 and even connect to an overlay network (discussed with respect to FIG. 4 below).

Figure 4:
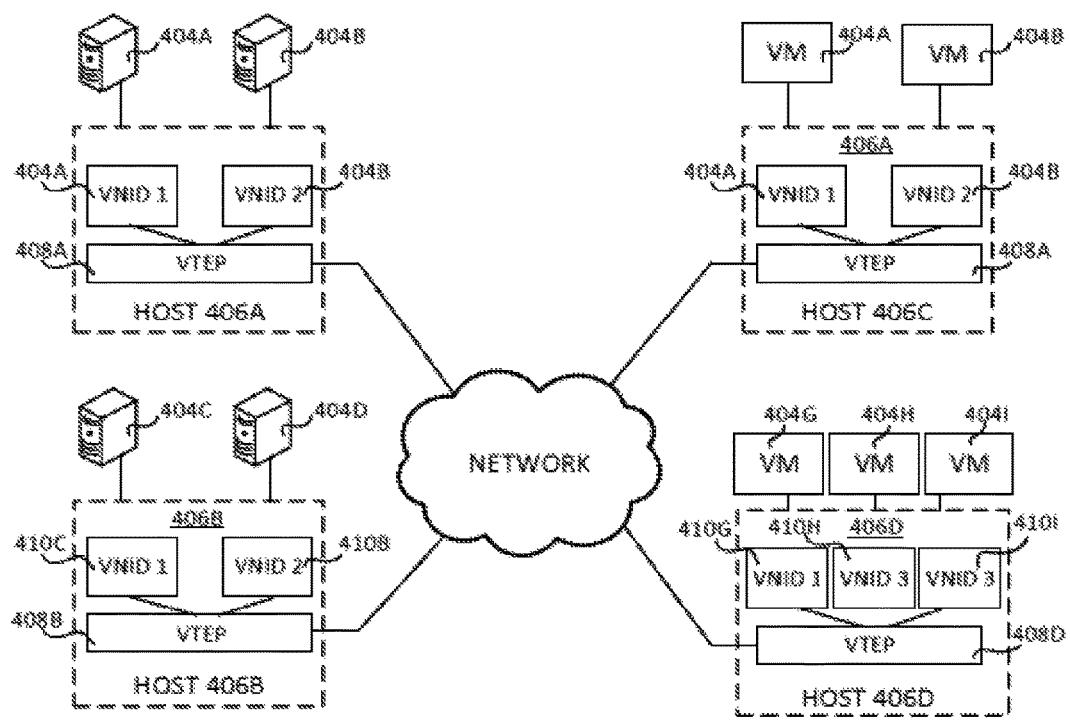
FIG. 4 illustrates an exemplary overlay network.

As shown, leaf switches A-N can connect with devices such as endpoint(s) 315, which may include servers, resources, endpoints, external networks, VMs, and the like. In some cases, the endpoints 315 can include a server, hypervisor, or switch configured with a VTEP functionality which further connects an overlay network, such as the overlay network discussed below (ref. FIG. 4). Overlay networks can host physical devices, such as servers, applications, EPGs, virtual segments, virtual workloads, etc. In addition, endpoints 315 can host virtual workload(s), clusters, and applications or services, which can connect with the fabric 305 or any other device or network, including an external network. For example, one or more endpoints 315 can host, or connect to, a cluster of load balancers or an EPG of various applications.

In some embodiments, one or more of endpoint(s) 315 may be grouped as an "endpoint group" (EPG) in a network for mapping applications. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries. In some cases, leaf switches A-N can connect EPGs to the fabric 305 and/or other external networks. In this fashion, each EPG can connect to fabric 305 via one of the leaf switches A-N.

Notably, although fabric 305 is illustrated and described herein as an example leaf-spine architecture employing switches, one of ordinary skill in the art will readily recognize that the subject technology employ any number of devices (e.g., routers, etc.), and further the subject technology can be implemented based on any network fabric, including any data center or cloud network fabric. Indeed, other architectures, designs, infrastructures, and variations are contemplated herein. Further, any number of other devices (e.g., route reflectors, etc.) can be included, or even devices as shown may be excluded, as appropriate.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

As discussed above, data centers include a large number of devices interconnected in a complex network. In particular, in a data center fabric, there are millions of flows at any given point in time. Most often in production, network administrator/operator would want to capture one or more of these flows to be analyzed. Traditional monitoring mechanisms were not designed with data center fabric in mind and they are (1) limited by bandwidth consumptions in terms of extra headers or individual copies to every analyzer (or interchangeably referred henceforth as Copy Device) carried across the fabric. (2) limitation that analyzers need to be aware of ERSPAN header and (3) the number of such flows that can be supported is usually limited to few tens or hundreds due to hardware resource constraints.

As disclosed herein, the monitoring techniques based on per flow traffic may be a standalone service or may be incorporated (e.g., as an extension) of one or more conventional monitoring services.

Figure 5:
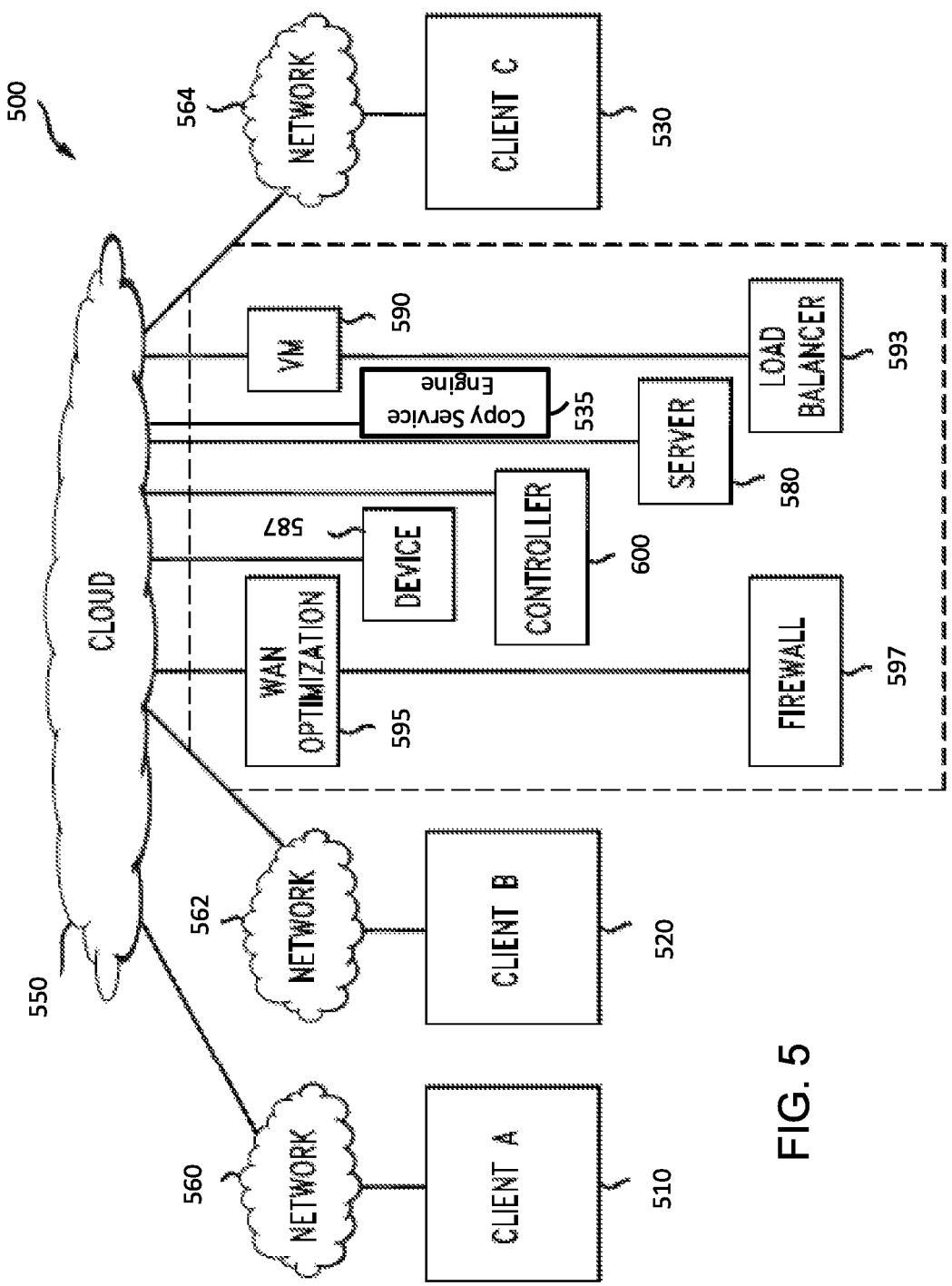
FIG. 5 illustrates a schematic block diagram of example cloud architecture.

FIG. 5 illustrates a schematic block diagram of an example cloud architecture 500 including nodes/devices interconnected by various methods of communication. Cloud 550 can be a public, private, and/or hybrid cloud system. Cloud 550 can include resources, such as one or more Firewalls 597; Load Balancers 593; WAN optimization platforms 595; devices 587, such as switches, routers, intrusion detection systems, Auto VPN systems, or any hardware or software network device; servers 580, such as dynamic host configuration protocol (DHCP), domain naming system (DNS), or storage servers; virtual machines (VMs) 590; controllers 600, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 550 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 550 can handle traffic and/or provision services. For example, cloud 550 can provide configuration services, such as auto VPN, automated deployments, automated wireless configurations, automated policy implementations, and so forth. In some cases, the cloud 550 can collect data about a client or network and generate configuration settings for specific service, device, or networking deployments. For example, the cloud 550 can generate security policies, subnetting and routing schemes, forwarding schemes, NAT settings, VPN settings, and/or any other type of configurations. The cloud 550 can then push or transmit the necessary data and settings to specific devices or components to manage a specific implementation or deployment. For example, the cloud 550 can generate VPN settings, such as IP mappings, port number, and security information, and send the VPN settings to specific, relevant device(s) or component(s) identified by the cloud 550 or otherwise designated. The relevant device(s) or component(s) can then use the VPN settings to establish a VPN tunnel according to the settings.

To further illustrate, cloud 550 can provide specific services for client A (510), client B (520), and client C (530). For example, cloud 550 can deploy a network or specific network components, configure links or devices, automate services or functions, or provide any other services for client A (510), client B (520), and client C (530). Other non-limiting example services by cloud 550 can include network administration services, network monitoring services, content filtering services, application control, WAN optimization, firewall services, gateway services, storage services, protocol configuration services, wireless deployment services, and so forth.

To this end, client A (510), client B (520), and client C (530) can connect with cloud 550 through networks 560, 562, and 564, respectively. More specifically, client A (510), client B (520), and client C (530) can each connect with cloud 550 through networks 560, 562, and 564, respectively, in order to access resources from cloud 550, communicate with cloud 550, or receive any services from cloud 550. Networks 560, 562, and 564 can each refer to a public network, such as the Internet; a private network, such as a LAN; a combination of networks; or any other network, such as a VPN or an overlay network.

Moreover, client A (510), client B (520), and client C (530) can each include one or more networks. For example, (510), client B (520), and client C (530) can each include one or more LANs and VLANs. In some cases, a client can represent one branch network, such as a LAN, or multiple branch networks, such as multiple remote networks. For example, client A (510) can represent a single LAN network or branch, or multiple branches or networks, such as a branch building or office network in Los Angeles and another branch building or office network in New York. If a client includes multiple branches or networks, the multiple branches or networks can each have a designated connection to the cloud 550. For example, each branch or network can maintain a tunnel to the cloud 550. Alternatively, all branches or networks for a specific client can connect to the cloud 550 via one or more specific branches or networks. For example, traffic for the different branches or networks of a client can be routed through one or more specific branches or networks. Further, client A (510), client B (520), and client C (530) can each include one or more routers, switches, appliances, client devices, VMs, or any other devices. In some cases, client A (510), client B (520), and/or client C (530) can also maintain links between branches. For example, client A can have two branches, and the branches can maintain a link between each other.

In some cases, branches can maintain a tunnel between each other, such as a VPN tunnel. Moreover, the link or tunnel between branches can be generated and/or maintained by the cloud 550. For example, the cloud 550 can collect network and address settings for each branch and use those settings to establish a tunnel between branches. In some cases, the branches can use a respective tunnel between the respective branch and the cloud 550 to establish the tunnel between branches. For example, branch 1 can communicate with cloud 550 through a tunnel between branch 1 and cloud 550 to obtain the settings for establishing a tunnel between branch 1 and branch 2. Branch 2 can similarly communicate with cloud 550 through a tunnel between branch 2 and cloud 550 to obtain the settings for the tunnel between branch 1 and branch 2.

Cloud 550 can also maintain one or more links or tunnels to client A (510), client B (520), and client C (530). For example, cloud 550 can maintain a VPN tunnel to one or more devices in client A's network. In some cases, cloud 550 can configure the VPN tunnel for a client, maintain the VPN tunnel, or automatically update or establish any link or tunnel to the client or any devices of the client.

The cloud 550 can also monitor device and network health and status information for client A (510), client B (520), and client C (530). To this end, client A (510), client B (520), and client C (530) can synchronize information with cloud 550. Cloud 550 can also manage and deploy services for client A (510), client B (520), and client C (530). For example, cloud 550 can collect network information about client A and generate network and device settings to automatically deploy a service for client A. In addition, cloud 550 can update device, network, and service settings for client A (510), client B (520), and client C (530). For example, cloud 550 can generate authorization extensions for feature models, as further described below.

Those skilled in the art will understand that the cloud architecture 550 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 550 can include any number or type of resources, which can be accessed and utilized by clients or tenants. The illustration and examples provided herein are for clarity and simplicity.

In some cases, cloud 550 can include a copy service engine 535 that can monitor network data flow, determine when a contract defining copy parameters hits a network node described in the contract, and execute a copy service, as further described below. Moreover, as far as communications within the cloud architecture 500, packets (e.g., traffic and/or messages) can be exchanged among the various nodes and networks in the cloud architecture 500 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

Figure 6:
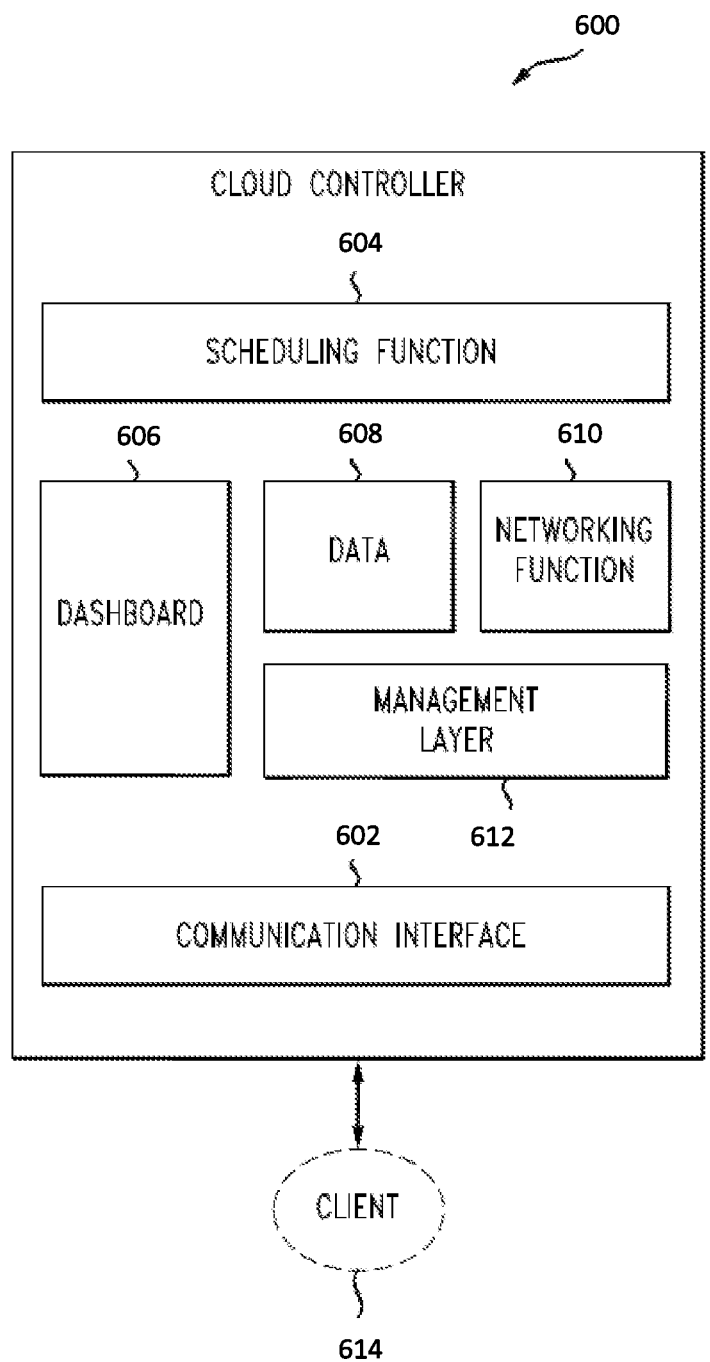
FIG. 6 illustrates a schematic block diagram of an example cloud controller.

FIG. 6 illustrates a schematic block diagram of an example cloud controller 600. The cloud controller 600 can serve as a cloud service management system for the cloud 550. In particular, the cloud controller 600 can manage cloud operations, client communications, service provisioning, network configuration and monitoring, etc. For example, the cloud controller 600 can manage cloud service provisioning, such as cloud storage, media, streaming, security, or administration services. In some embodiments, the cloud controller 600 can generate authorization extensions for feature models as further described below.

For example, the cloud controller 600 can receive access requests from an access point connected to the network through a switch port via a secure tunnel, determine that the access point is trusted, and negotiate security material with the access point without requiring manual configuration, and instruct the switch port to adopt a trusted PNAC policy for the trusted access point.

The cloud controller 600 can include several subcomponents, such as a scheduling function 604, a dashboard 606, data 608, a networking function 610, a management layer 612, and a communications interface 602. The various subcomponents can be implemented as hardware and/or software components. Moreover, although FIG. 6 illustrates one example configuration of the various components of the cloud controller 600, those of skill in the art will understand that the components can be configured in a number of different ways and can include any other type and number of components. For example, the networking function 610 and management layer 612 can belong to one software module or multiple separate modules. Other modules can be combined or further divided up into more subcomponents.

The scheduling function 604 can manage scheduling of procedures, events, or communications. For example, the scheduling function 604 can schedule when resources should be allocated from the cloud 550. As another example, the scheduling function 604 can schedule when specific instructions or commands should be transmitted to the client 614. In some cases, the scheduling function 604 can provide scheduling for operations performed or executed by the various subcomponents of the cloud controller 600. The scheduling function 604 can also schedule resource slots, virtual machines, bandwidth, device activity, status changes, nodes, updates, etc.

The dashboard 606 can provide a frontend where clients can access or consume cloud services. For example, the dashboard 606 can provide a web-based frontend where clients can configure client devices or networks that are cloud-managed, provide client preferences, specify policies, enter data, upload statistics, configure interactions or operations, etc. In some cases, the dashboard 606 can provide visibility information, such as views of client networks or devices. For example, the dashboard 606 can provide a view of the status or conditions of the client's network, the operations taking place, services, performance, a topology or layout, specific network devices, protocols implemented, running processes, errors, notifications, alerts, network structure, ongoing communications, data analysis, etc.

Indeed, the dashboard 606 can provide a graphical user interface (GUI) for the client 614 to monitor the client network, the devices, statistics, errors, notifications, etc., and even make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some cases, the dashboard 606 can also handle user or client requests. For example, the client 614 can enter a service request through the dashboard 606.

The data 608 can include any data or information, such as management data, statistics, settings, preferences, profile data, logs, notifications, attributes, configuration parameters, client information, network information, and so forth. For example, the cloud controller 600 can collect network statistics from the client 614 and store the statistics as part of the data 608. In some cases, the data 608 can include performance and/or configuration information. This way, the cloud controller 600 can use the data 608 to perform management or service operations for the client 614. The data 608 can be stored on a storage or memory device on the cloud controller 600, a separate storage device connected to the cloud controller 600, or a remote storage device in communication with the cloud controller 600.

The networking function 610 can perform networking calculations, such as network addressing, or networking service or operations, such as auto VPN configuration or traffic routing. For example, the networking function 610 can perform filtering functions, switching functions, automatic link security functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 610 can handle networking requests from other networks or devices and establish links between devices. In other embodiments, the networking function 610 can perform queueing, messaging, or protocol operations.

The management layer 612 can include logic to perform management operations. For example, the management layer 612 can include the logic to allow the various components of the cloud controller 600 to interface and work together. The management layer 612 can also include the logic, functions, software, and procedure to allow the cloud controller 600 perform monitoring, management, control, and administration operations of other devices, the cloud 550, the client 614, applications in the cloud 550, services provided to the client 614, or any other component or procedure. The management layer 612 can include the logic to operate the cloud controller 600 and perform particular services configured on the cloud controller 600.

Moreover, the management layer 612 can initiate, enable, or launch other instances in the cloud controller 600 and/or the cloud 550. In some embodiments, the management layer 612 can also provide authorization and security services for the cloud 550, the client 614, the controller 614, and/or any other device or component. Further, the management layer 612 can manage nodes, resources, VMs, settings, policies, protocols, communications, etc. In some embodiments, the management layer 612 and the networking function 610 can be part of the same module. However, in other embodiments, the management layer 612 and networking function 610 can be separate layers and/or modules. The communications interface 602 allows the cloud controller 600 to communicate with the client 614, as well as any other device or network. The communications interface 602 can be a network interface card (NIC), and can include wired and/or wireless capabilities. The communications interface 602 allows the cloud controller 600 to send and receive data from other devices and networks. In some embodiments, the cloud controller 600 can include a copy service engine 635 that can monitor network data flow, determine when a contract defining copy parameters hits a network node described in the contract, and execute a copy service, as further described below.

The cloud service engine described above can implement monitoring techniques based on per flow traffic, copy data packets for the flow, and send copies to one or more analyzers for further processing. In some cases, the monitoring techniques particularly include a copy service that monitors a data flow in a network (e.g., a data center network), and copies packets for the flow and sends copies of the packets to one or more analyzers for further processing.

For example, flows in an ACI fabric can be classified using source and destination End Point Groups (EPGs). EPGs are identified L3 address and/or VLAN. Each traffic flow needs to abide a contract (also known as policy) to be allowed through the fabric. A contract can be configured to allow/deny a flow through the fabric. In some cases, depending on the forwarding behavior these contracts gets either applied at the ingress or egress switch in the fabric.

A copy service engine can support monitoring of any such traffic flow between two EPGs by extending the functionality of such contracts. In some cases, when a traffic flow hits a contract and it is configured to be a copy contract, copies of traffic can be sent to one or more analyzers. These contracts can be hit at ingress, egress, hops, etc. depending on where the endpoints are resolved.

Figure 7A:
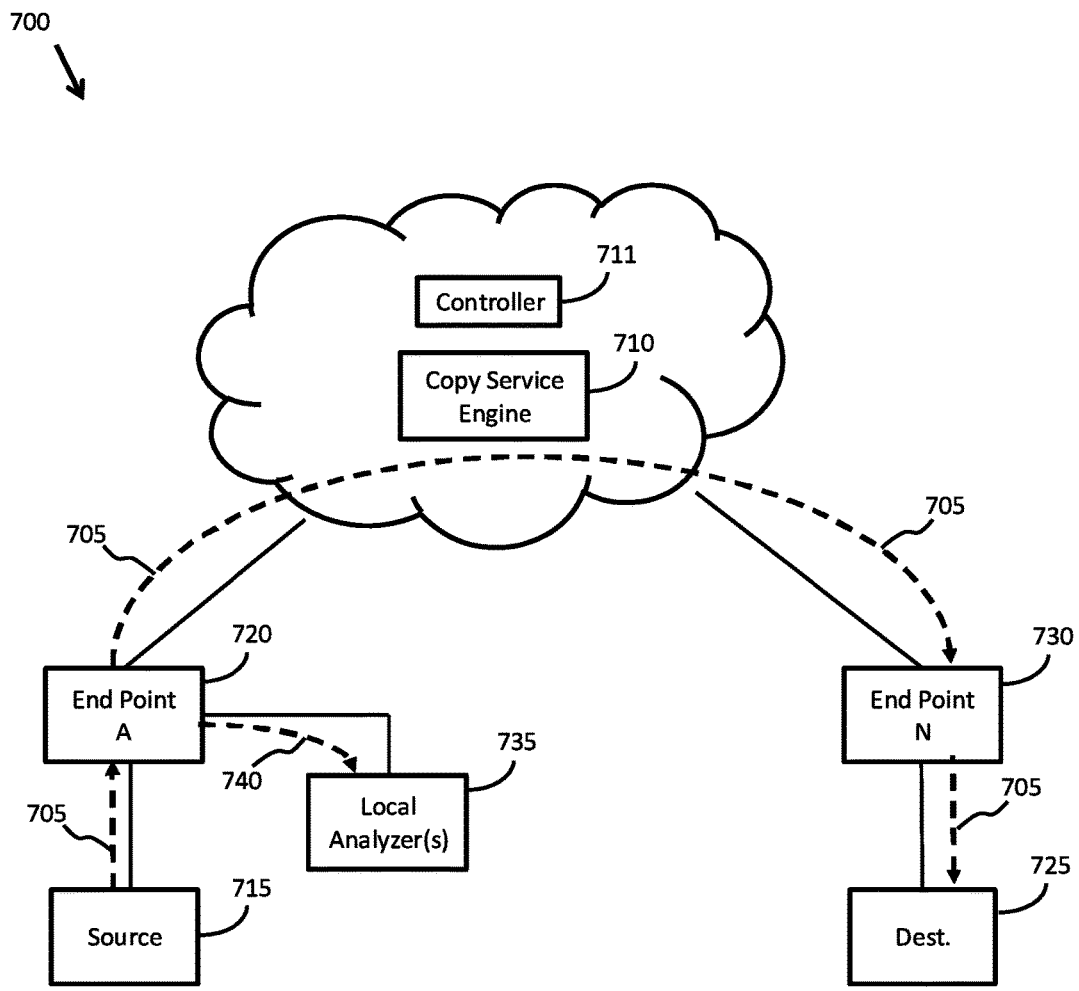
FIGS. 7A-7B illustrate a schematic block diagram of example computing networking architectures.

FIG. 7A illustrates a schematic block diagram of an example computing networking architecture including a network-based controller 710 and copy service engine 710 as well as a traffic flow between a source 715 and a destination 725 that are connected in a network 700. Source 715 is connected to the network 700 through Endpoint A 720 and destination 725 is connected to the network 700 through Endpoint B 730.

The traffic flow 705 between a source 715 and a destination 725 can include packet data containing a contract defining copy parameters for the execution of a copy service. For example, the copy parameters can be defined in one or more of a Layer-2 field, a Layer-3 field, and a Layer-4 field of the contract parameters. One or more of the controller 710 and the copy service engine 711 can monitor the data flow in the network 700 and determine, based on the contract, when the particular data flow hits a particular network node specified in the contract parameters. For example, the controller 710 and/or the copy service engine 711 can detect when the contract hits Endpoint A 720 (i.e. ingress) and can determine that the contract parameters specify that the copy service should be executed. In some cases, Endpoint A includes a copy service module that can execute the copy service, Endpoint A can request that the copy service engine 710 execute the copy service, and both the copy service engine 710 and Endpoint A 720 can collaborate to execute the copy service.

In some cases, execution of the copy service can involve, making a copy of the data packets, deciding on one or more endpoints (e.g. analyzers) to send the copies, and actually deploying the copies to the endpoints.

The analyzers can also be connected to different ports on the same switch where the traffic flow hit a contract and/or to different switches. Furthermore, in some cases, when the copied traffic is sent to a group of analyzers that are connected to other remote switches, there is only one copy of the traffic per remote switch sent across the fabric, thereby avoid de-duplication requirements.

As shown in FIG. 7A, Endpoint A 720 is associated with local analyzer(s) 735. When the copy service specifies local analyzer(s) 735, the copied data packets are flooded in the group of analyzer(s) 735—as indicated by copy data flow 740.

Figure 7B:
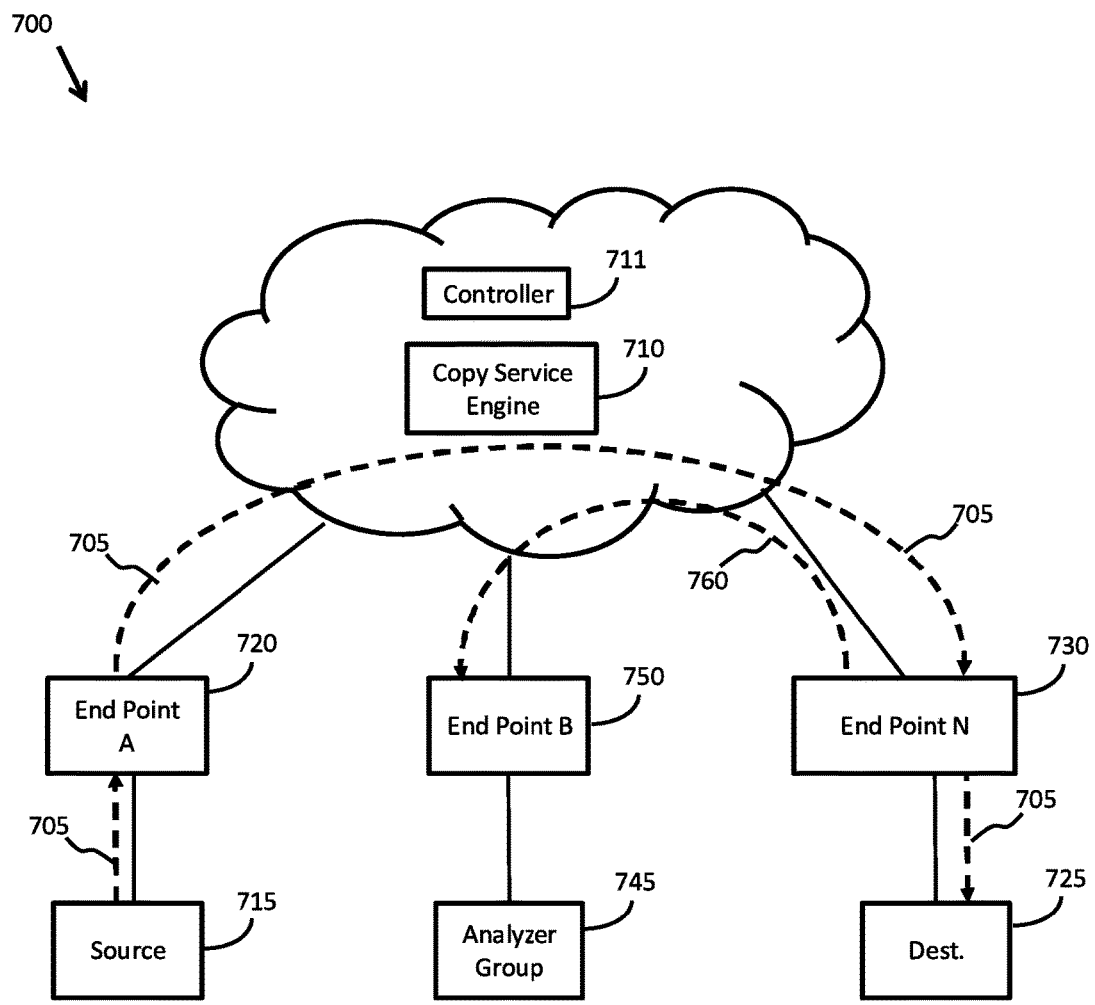

FIG. 7B illustrates another schematic block diagram of an example computing networking architecture including a network-based controller 710 and copy service engine 711 as well as a traffic flow between a source 715 and a destination 725 that are connected in a network 700. Source 715 is connected to the network 700 through Endpoint A 720 and destination 725 is connected to the network 700 through Endpoint B 730.

In FIG. 7B, the contract hits at the egress of the data flow between the End Point 720 and 730 and the controller 710 and/or the copy service engine 711 can detect when the contract hits Endpoint A 720 and determine that the contract parameters specify that the copy service should be executed. According to FIG. 7B, the copy service specifies analyzer group 745 at a remote Endpoint B 750 and the copy services causes the copied data packets are flooded to analyzer group 745—as indicated by copy data flow 760. The analyzer group 745 can include two or more analyzers and the copied data flow 760 can flood each of the two or more analyzers.

Figure 8:
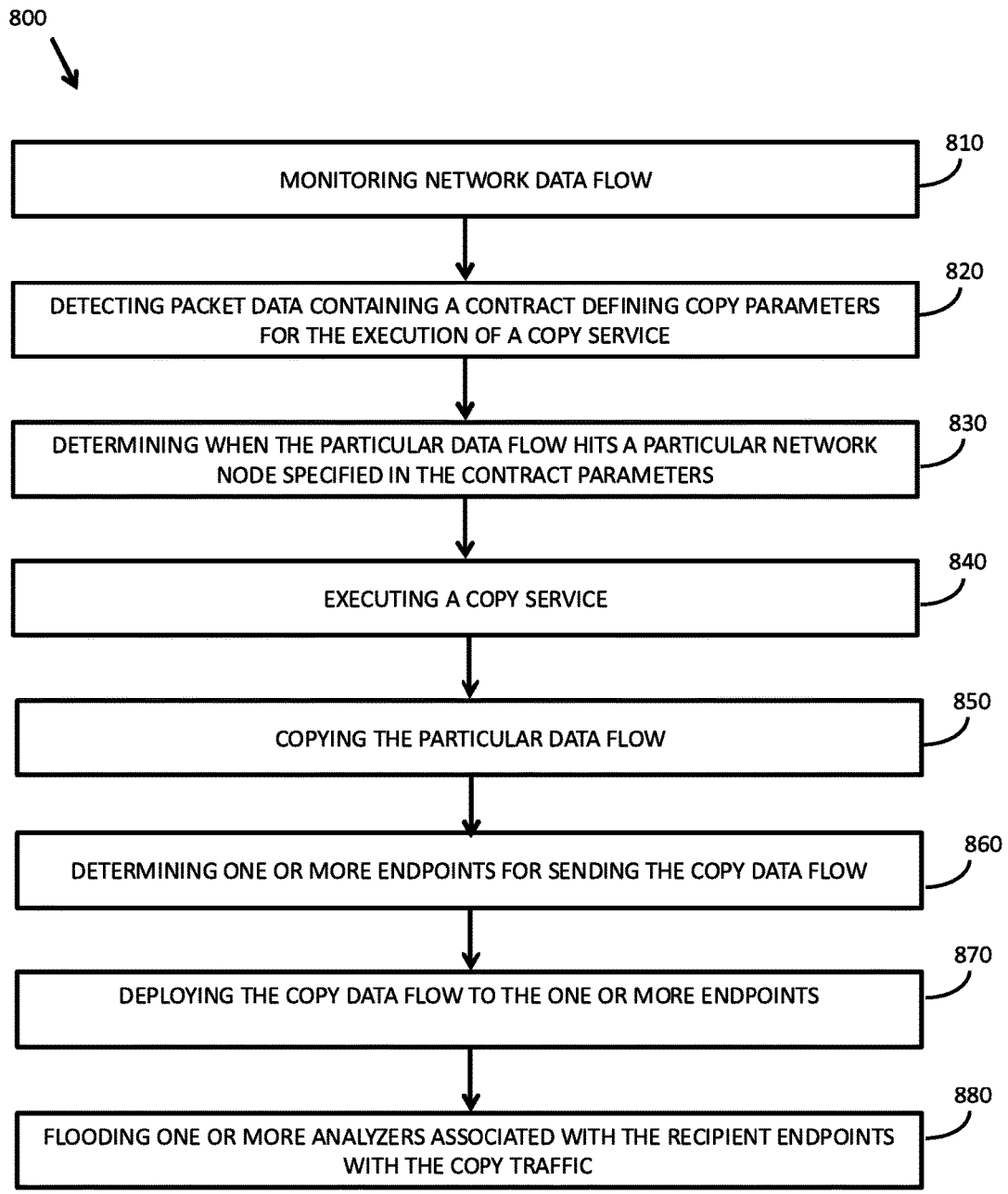
FIG. 8 illustrates an example method of executing a copy service using a contract describing a data flow between network nodes.

FIG. 8 illustrates an example method 800 of executing a copy service using a contract describing a data flow between network nodes. The method 800 involves monitoring a network data flow 810. For example, network data flow can be monitored by a controller, a copy service engine, etc. Next, as a result of the monitoring, the method 800 can involve detecting packet data containing a contract defining copy parameters for the execution of a copy service 810. In some cases, the copy parameters are defined in one or more of a Layer-2 field, Layer-3 field, and a Layer-4 field of the contract. Also, the copy parameters specify that the copy service is executed at ingress to a particular network node, at egress away from the particular network node, upon the data flow making a hop between the particular network node and another network node (e.g. through a load balancer), etc.

Next, the method 800 can involve determining when the particular data flow hits a particular network node specified in the contract parameters 830 and executing a copy service 840. In some cases, the copy service is executed locally on the node specified by the copy parameters, on the cloud-based copy service engine, etc.

With execution of the copy service, the method 800 involves making the copy of the data flow 850 and determining one or more endpoints for sending the copy data flow 860, deploying the copy data flow to the one or more endpoints 870, and flooding one or more analyzers associated with the recipient endpoints with the copy traffic 880.

The copy service engine can also support virtual private cloud (VPC) architecture. In some cases, analyzers or copy devices can sit behind a VPC and since the copied packet follows the regular forwarding behavior it ensures that we send only one copy to the device. When the copy device is attached behind a VPC, one packet per TOR is received in the VPC and the packet is flooded on the VLAN on both the TOR. The VPC pruning logic can ensure only a single copy is delivered to the copy device. When the copy devices are attached to remote TORs, the same fabric port that the regular traffic would take to reach the destination TOR is avoided. In some cases, a simple round robin algorithm is used to spread the copy traffic across different fabric ports so that any one link will not be congested with the original plus copy traffic. This ensures load balancing of fabric connectivity.

Figure 9:
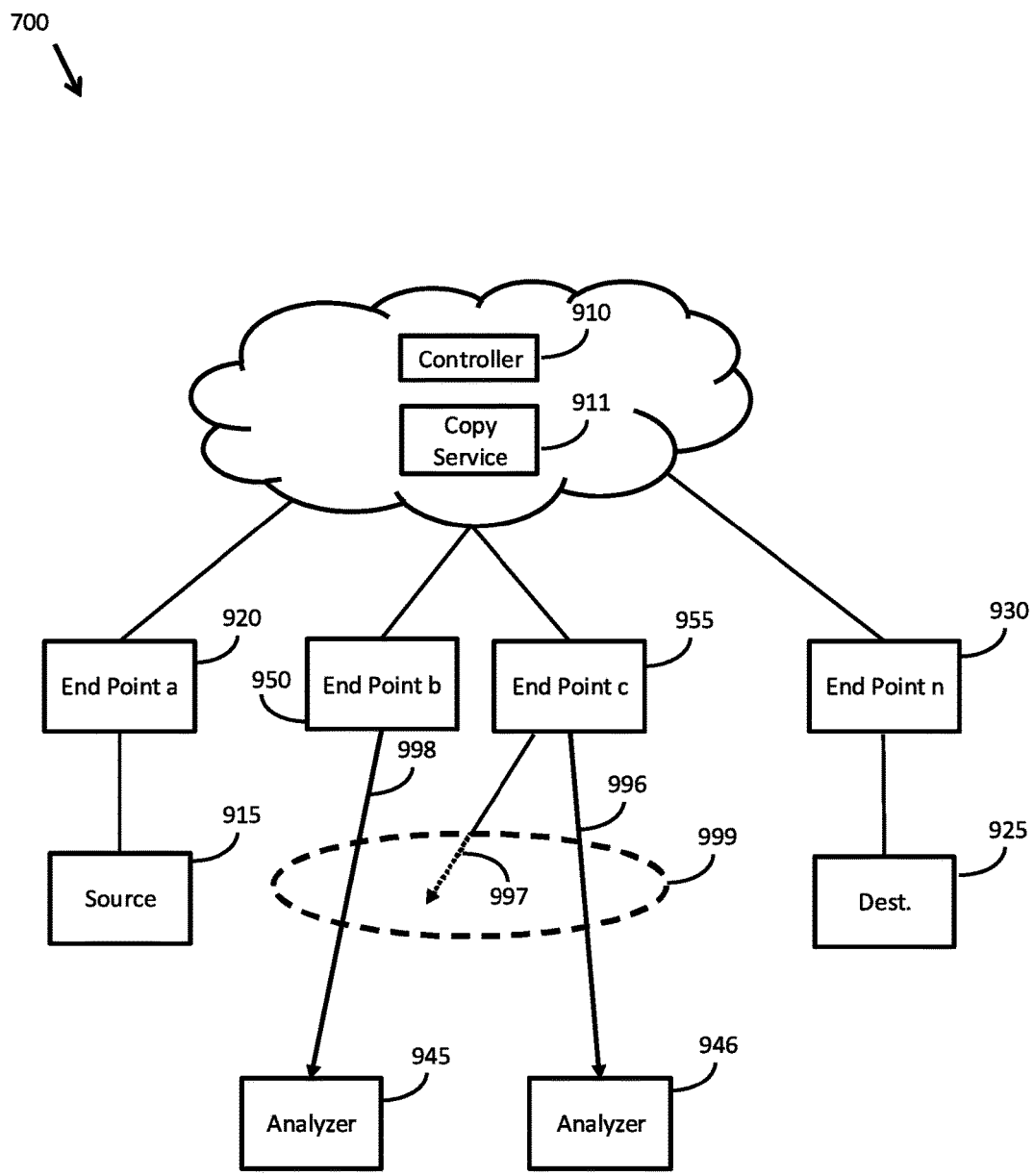
FIG. 9 illustrates another schematic block diagram of an example computing networking architecture including a network-based controller.

In some cases, the copy service can specify that copy traffic should be sent to one or more analyzer connected to a virtual private cloud (VPC) or to an analyzer in a top-of-rack (TOR) as the source node. FIG. 9 illustrates another schematic block diagram of an example computing networking architecture including a network-based controller 910 and copy service engine 911 as well as a traffic flow between a source 915 and a destination 925 that are connected in a network 900. Source 915 is connected to the network 900 through Endpoint A 920 and destination 925 is connected to the network 900 through Endpoint N 930.

In FIG. 9, the contract specifies that the copy service should be executed at ingress and the controller 910 and/or the copy service engine 911 can detect when the contract hits Endpoint A 920 and determine that the contract parameters specify that the copy service should be executed. According to FIG. 9, the copy service specifies analyzers 945, 946 connected in a Virtual Private Cloud (VPC) 999 through remote Endpoint B 950 and remote Endpoint C 955. In some cases, the VPC 999 can resolve how endpoints 950, 955 should send copies 998, 997, 996 of the packet data and for flooding the analyzers 945, 946 without sending duplicate copies. As shown, the VPC 999 prunes a copy 997 of packet data to avoid analyzers 945, 946 receiving duplicate copy data.

In some cases, the copy traffic can also be sent on a special VLAN which can be configured to be in a pure flood mode in all the TORs. In some cases, the Copy Services always sends packets to remote/copy TOR where the copy analyzers are attached using a special VLAN. This VLAN is configured to be in pure flood mode. When the copy TOR (this could be the same TOR where the contract is hit or a remote TOR) receives this packet, it floods to all the attached analyzers ports on that VLAN.

Since the traffic forwarding for the copied frames also follows the regular forwarding behavior, analyzers can also be located behind a VM. Also, these copy contracts can also be configured to be applied on a specific segment of the traffic path through the fabric such as after firewall inspection or after load balancer.

In some cases, the copied traffic flow is an exact copy of the original frame with minor modification to the headers and without modification of any data or the addition any extra headers. No additional headers are appended to the copied frame.

The improved monitoring techniques disclosed herein provide fine grained identification of the traffic flow thus avoiding resource consumption by making copies of unwanted traffic. Also, a contract can be configured and applied at a specific segment of the path through the fabric (such as after the load balancer is hit or after a firewall is hit). The controller and/or copy service can also track end points across VM movement (e.g., due to fine grain endpoint identification of a flow), can provide support for sending the copies to multiple destinations, can prevent traffic spill or overflow from tenants since analyzers can be grouped in different groups (e.g., contracts can be specifically applied per tenant); and can be scalable without requiring additional resources since these monitoring techniques avoid introducing additional headers and/or avoid unwanted traffic transmission across the fabric.

While there have been shown and described illustrative embodiments for improved monitoring based on per flow analysis of network traffic in a data center network, it is to be understood that various other adaptations and modifications may be made within the spirit and scope of the embodiments herein. For example, the embodiments have been shown and described herein with relation to network switches and a control plane comprising the network switches. However, the embodiments in their broader sense are not as limited, and may, in fact, be used with any number of network devices (e.g., routers), and the like.

Figure 10A:
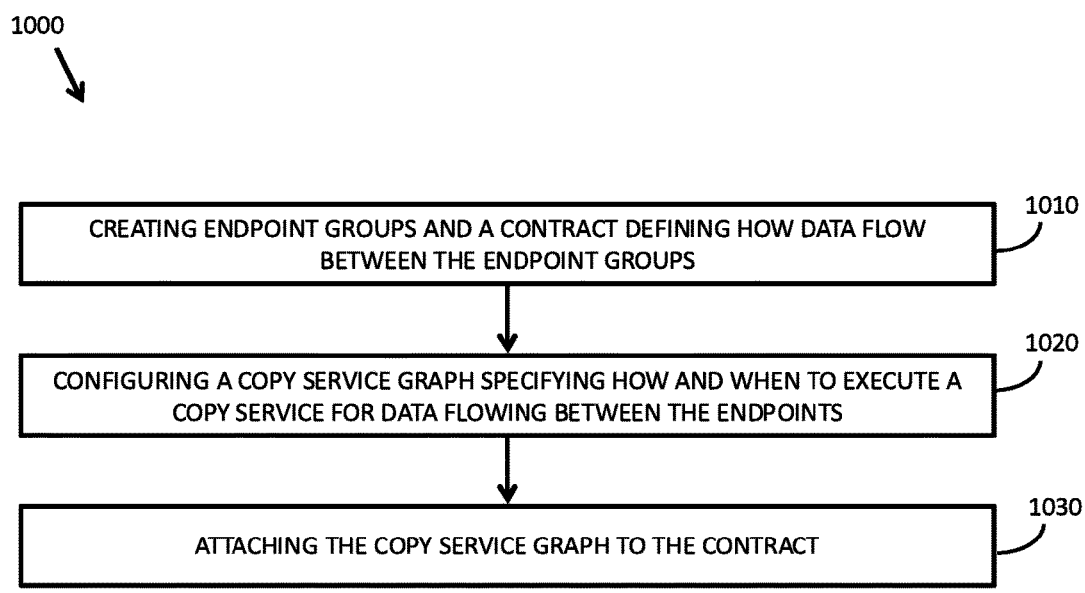
FIGS. 10A-10C illustrates example methods of configuring a copy service.

FIG. 10A illustrates an example method 1000 of configuring a copy service. The method 1000 involves creating endpoint groups and a contract defining how data flow between the endpoint groups 1010. Configuring endpoint groups for which you are trying to configure a copy service can involve applying contracts between endpoint groups as traffic can flow between epg only if you have valid contract between them. Next, the method 1000 involves configuring a copy service graph 1020 specifying how and when to execute a copy service for data flowing between the endpoints. In some cases a service graph can specify copy service as one of service node, and once a copy node on path between two nodes in graph, all traffic between nodes are copied to copy node as well. Finally, the method 1000 involves attaching the copy service graph to the contract 1030.

Figure 10B:
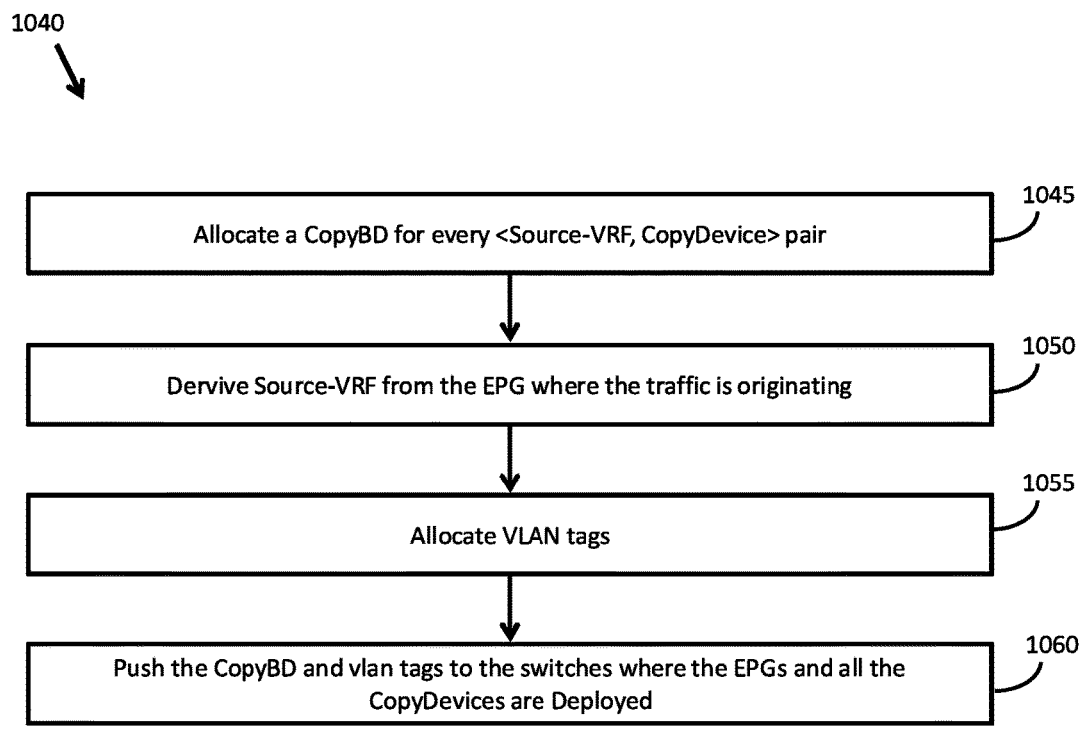

FIG. 10B illustrates a method 1040 of pushing copy configurations to individual switches. First, a controller first creates a copy BD per <source-vrf, CopyDevice> pair 1045 and a Source-vrf is vrf of consumer EPG and CopyDevice is the device specified in copy graph 1050. Next, the method 1040 involves allocating VLAN tag for all interfaces in copy device 1055 and pushing these BD and VLAN configurations on all switches where EPG and copy devices are deployed 1060.

Figure 10C:
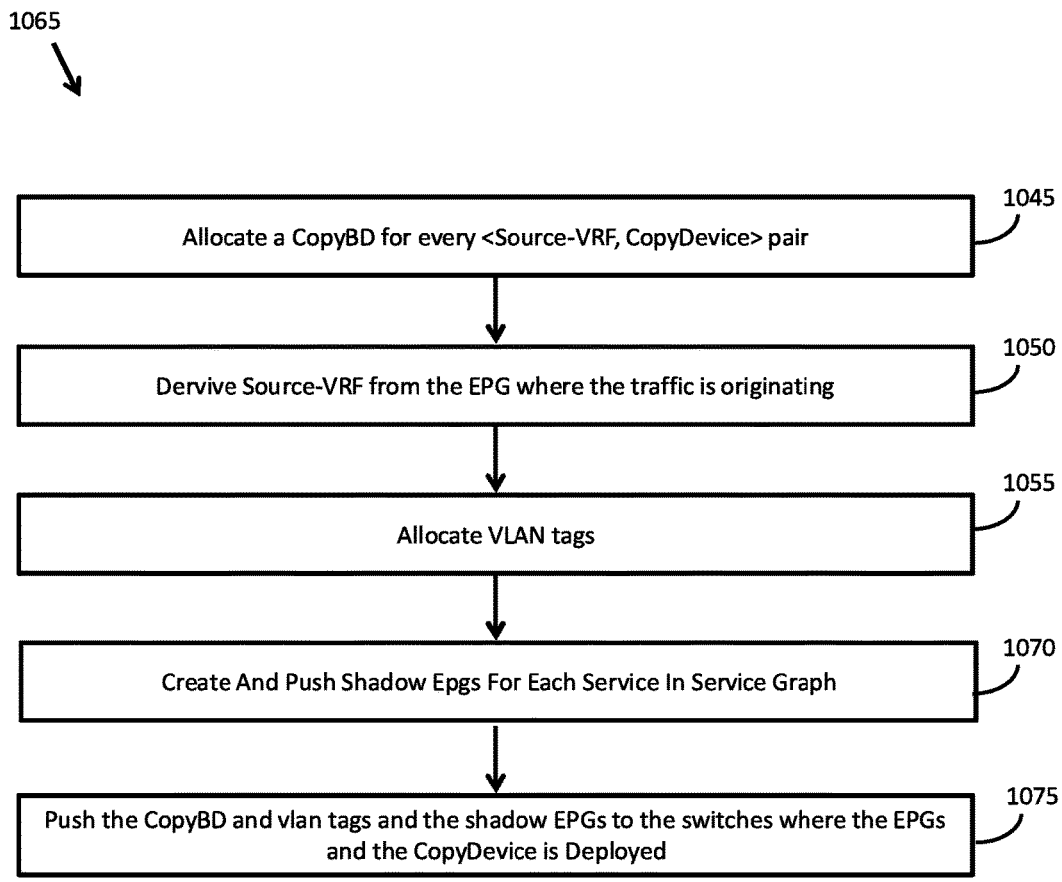

FIG. 10C illustrates a method 1065 of pushing copy configurations to individual switches. FIG. 10C represents a scenario in which a user configured copy service along with other services in graph. In these cases, the controller can follow steps 1045, 1050, 1055 from FIG. 10B, but controller will also create and push shadow EPGs for each service in service graph 1070. For example, if a firewall is also in path, then controller will create shadow EPG one for firewall incoming traffic and one for outgoing traffic. Next, the method 1065 involves pushing these BD and VLAN configurations on all switches where EPG and copy devices are deployed 1075.

Figure 11A:
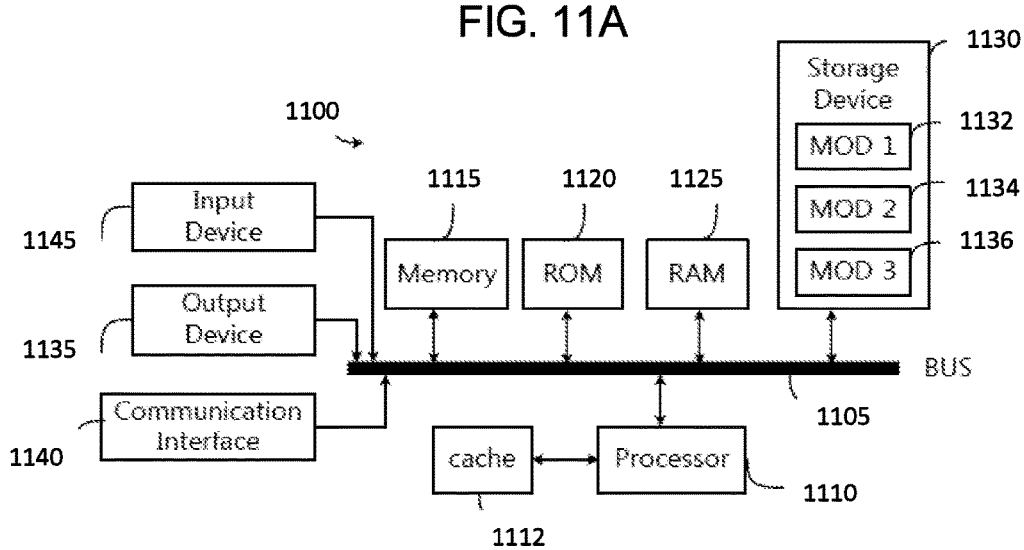
FIGS. 11A-11B illustrate example system embodiments.
Figure 11B:
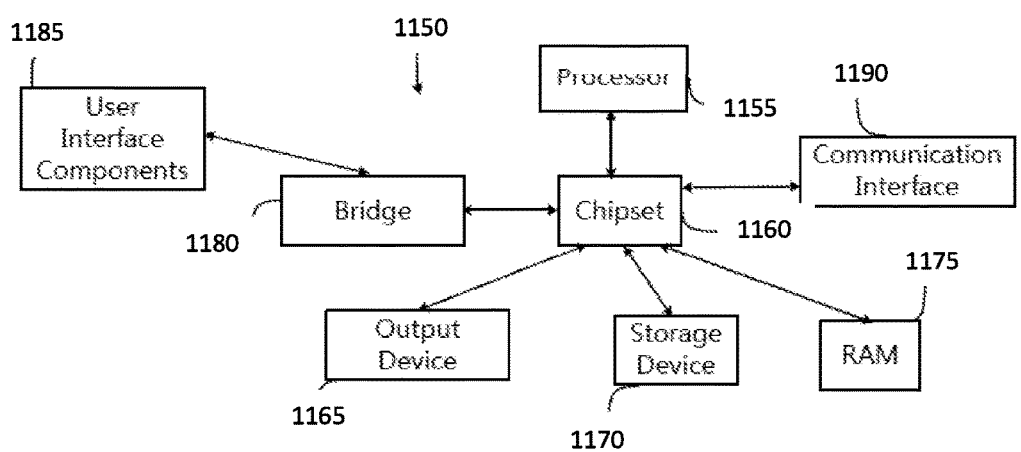

FIG. 11A and FIG. 11B illustrate example system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1170 and random access memory (RAM) 1175, to the processor 1110. The system 1100 can include a cache of high-speed memory connected directly with, in close proximity to, or integrated as part of the processor 1110. The system 1100 can copy data from the memory 1115 and/or the storage device 1130 to the cache 1117 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1137, module 7 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1175, read only memory (ROM) 1170, and hybrids thereof.

The storage device 1130 can include software modules 1137, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates an example computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method comprising:
   monitoring, by a copy service engine associated with a controller, network data flow in a network associated with the controller, the data flow being sent to a destination;
   detecting, in a particular data flow, packet data containing a contract defining copy parameters for execution of a copy service;
   determining, based on the contract, that the particular data flow hits a particular network node specified in the contract parameters; and
   executing, by the copy service engine in response to the determining, a copy service which copies the particular data flow, determines one or more endpoints for sending the copied data flow, and deploys the copied data flow to the one or more endpoints;
   wherein the one or more endpoints are different from the destination; and
   wherein the executing a copy service comprises duplicating the particular data flow.

2. The computer-implemented method of claim 1, wherein the copy parameters are defined in one or more of a Layer-2 field and a Layer-3 field of the contract parameters.

3. The computer-implemented method of claim 1, wherein the copy parameters specify that the copy service is executed at ingress to the particular network node specified in the contract parameters.

4. The computer-implemented method of claim 1, wherein the copy parameters specify that the copy service is executed at egress away from the particular network node specified in the contract parameters.

5. The computer-implemented method of claim 1, wherein the copy parameters specify that the copy service is executed upon the data flow making a hop between the particular network node specified in the contract parameters and another network node.

6. The computer-implemented method of claim 1, wherein the copy service determines that the one or more endpoints are locally connected to the particular network node specified in the contract parameters, and wherein the copies are deployed to the locally-connected one or more endpoints without an additional header.

7. The computer-implemented method of claim 1, wherein the copy service deploys the copies by flooding each of the one or more endpoints with the copied data flow.

8. The computer-implemented method of claim 1, wherein the one or more endpoint are connected in a VLAN, and wherein the copy service causes the VLAN to resolve how the copies are distributed to the endpoints in the VLAN.

9. The computer-implemented method of claim 1, wherein the copy service is executed by the controller.

10. The computer-implemented method of claim 1, wherein the particular network node contains an additional copy service engine, and there in the method further comprises:
    causing the additional copy service engine in the particular network node to execute the copy service.

11. A cloud controller on a network, the cloud controller comprising:
    a processor; and
    a computer-readable storage medium having stored therein instructions which, when executed by the processor, cause the processor to perform operations comprising:
      monitoring network data flow in a network associated with the controller, the data flow being sent to a destination;
      detecting, in a particular data flow, packet data containing a contract defining copy parameters for execution of a copy service;
      determining, based on the contract, that the particular data flow hits a particular network node specified in the contract parameters; and
      executing a copy service in response to the determining which copies the particular data flow, determines one or more endpoints for sending the copied data flow, and deploys the copied data flow to the one or more endpoints;
    wherein the one or more endpoints are different from the destination; and
    wherein the executing a copy service comprises duplicating the particular data flow.

12. The cloud controller of claim 11, wherein the copy parameters are defined in one or more of a Layer-2 field and a Layer-3 field of the contract parameters.

13. The cloud controller of claim 11, wherein the copy parameters specify that the copy service is executed at one or more of the ingress to the particular network node specified in the contract parameters, the egress away from the particular network node specified in the contract parameters, and upon the data flow making a hop between the particular network node specified in the contract parameters and another network node.

14. The cloud controller of claim 11, wherein the copy service determines that the one or more endpoints are locally connected to the particular network node specified in the contract parameters, and wherein the copies are deployed to the locally-connected one or more endpoints without an additional header.

15. The cloud controller of claim 11, wherein the copy service deploys the copies by flooding each of the one or more endpoints with the copied data flow.

16. The cloud controller of claim 11, wherein the one or more endpoint are connected in a VLAN, and wherein the copy service causes the VLAN to resolve how the copies are distributed to the endpoints in the VLAN.

17. A non-transitory computer-readable storage medium having stored therein instructions which, when executed by a processor in a cloud controller associated with a network, cause the processor to perform operations comprising:

monitoring network data flow in a network associated with the controller, the data flow being sent to a destination;

detecting, in a particular data flow, packet data containing a contract defining copy parameters for execution of a copy service;

determining, based on the contract, that the particular data flow hits a particular network node specified in the contract parameters; and executing a copy service in response to the determining which copies the particular data flow, determines one or more endpoints for sending the copied data flow, and deploys the copied data flow to the one or more endpoints;

wherein the one or more endpoints are different from the destination; and wherein the executing a copy service comprises duplicating the particular data flow.

18. The non-transitory computer-readable storage medium of claim 17, wherein the copy parameters specify that the copy service is executed at one or more of the ingress to the particular network node specified in the contract parameters, the egress away from the particular network node specified in the contract parameters, and upon the data flow making a hop between the particular network node specified in the contract parameters and another network node.

19. The non-transitory computer-readable storage medium of claim 17, wherein the copy service determines that the one or more endpoints are locally connected to the particular network node specified in the contract parameters, and wherein the copies are deployed to the locally-connected one or more endpoints without an additional header.

20. The non-transitory computer-readable storage medium of claim 17, wherein the one or more endpoint are connected in a VLAN, and wherein the copy service causes the VLAN to resolve how the copies are distributed to the endpoints in the VLAN.

* * * * *